(12) United States Patent
Naik et al.

(10) Patent No.: US 7,515,588 B2
(45) Date of Patent: Apr. 7, 2009

(54) METHOD AND APPARATUS TO SUPPORT A LARGE INTERNET PROTOCOL FORWARDING INFORMATION BASE

(75) Inventors: Uday R. Naik, Fremont, CA (US); Alok Kumar, Santa Clara, CA (US); Eswar Eduri, Santa Clara, CA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 10/804,485

(22) Filed: Mar. 18, 2004

(65) Prior Publication Data

US 2005/0207409 A1 Sep. 22, 2005

(51) Int. Cl.
 *H04L 12/28* (2006.01)
 *H04L 12/56* (2006.01)
 *G06F 7/00* (2006.01)

(52) U.S. Cl. .................. 370/392; 370/395.32; 707/101

(58) Field of Classification Search ........................ None
See application file for complete search history.

(56) References Cited

U.S. PATENT DOCUMENTS

| | | | | |
|---|---|---|---|---|
| 5,694,591 | A * | 12/1997 | Du et al. ......................... | 707/2 |
| 6,381,668 | B1  | 4/2002  | Lunteren | |
| 6,560,610 | B1 * | 5/2003  | Eatherton et al. ......... | 707/104.1 |
| 6,691,171 | B1 * | 2/2004  | Liao ............................. | 709/245 |
| 6,804,230 | B1 * | 10/2004 | Jennings et al. ............. | 370/388 |
| 6,888,838 | B1 * | 5/2005  | Ji et al. ....................... | 370/401 |
| 6,910,043 | B2 * | 6/2005  | Iivonen et al. ............... | 707/101 |
| 6,985,483 | B2 * | 1/2006  | Mehrotra et al. ............ | 370/389 |
| 7,007,101 | B1 * | 2/2006  | Schwaderer ................ | 709/238 |
| 7,035,256 | B1 * | 4/2006  | Neufeld et al. ............. | 370/389 |
| 7,043,494 | B1 * | 5/2006  | Joshi et al. .................. | 707/101 |
| 7,222,129 | B2 * | 5/2007  | Kuboyama et al. ......... | 707/103 Y |
| 7,257,590 | B2 * | 8/2007  | Heiner et al. ................ | 707/101 |
| 7,352,739 | B1 * | 4/2008  | Rangarajan et al. ......... | 370/378 |
| 7,356,033 | B2 * | 4/2008  | Basu et al. .................. | 370/392 |
| 7,415,020 | B2 * | 8/2008  | Joung et al. ................. | 370/392 |
| 7,426,518 | B2 * | 9/2008  | Venkatachary et al. ...... | 707/101 |
| 7,430,560 | B1 * | 9/2008  | Mittal ......................... | 707/101 |
| 2002/0118682 | A1 * | 8/2002 | Choe ..................... | 370/395.31 |
| 2003/0058860 | A1 * | 3/2003 | Kunze et al. ................ | 370/392 |
| 2003/0081554 | A1 * | 5/2003 | Huang et al. ................ | 370/238 |

(Continued)

OTHER PUBLICATIONS

International Search Report, PCT/US2005/008613 (filed Mar. 14, 2005), Jun. 15, 2005.

(Continued)

*Primary Examiner*—Chi H Pham
*Assistant Examiner*—Warner Wong
(74) *Attorney, Agent, or Firm*—Blakely, Sokoloff, Taylor & Zafman LLP

(57) ABSTRACT

Method and apparatus to support a large Internet Protocol Forwarding Information Base. A packet is received at a network device, the packet including a destination address. A table is indexed into using a portion of the destination address to locate an entry in the table associated with the portion of the destination address. A pool index is derived from the portion of the destination address and is used to identify a pool of data blocks from among a plurality of pools of data blocks. The entry and the pool of data blocks are navigated to find a next-hop for the packet.

23 Claims, 10 Drawing Sheets

U.S. PATENT DOCUMENTS

| | | | |
|---|---|---|---|
| 2003/0198234 A1* | 10/2003 | Pin | 370/400 |
| 2003/0204515 A1* | 10/2003 | Shadmon et al. | 707/100 |
| 2004/0006639 A1* | 1/2004 | Mathew et al. | 709/238 |
| 2004/0008634 A1* | 1/2004 | Rangarajan et al. | 370/256 |
| 2004/0028040 A1* | 2/2004 | Kumar et al. | 370/389 |
| 2004/0052251 A1* | 3/2004 | Mehrotra et al. | 370/389 |
| 2004/0052254 A1* | 3/2004 | Hooper | 370/392 |
| 2004/0170170 A1* | 9/2004 | Joung et al. | 370/389 |
| 2004/0193632 A1* | 9/2004 | McCool et al. | 707/101 |
| 2004/0264479 A1* | 12/2004 | Raghunandan | 370/400 |
| 2005/0027679 A1* | 2/2005 | Sample | 707/1 |
| 2005/0078601 A1* | 4/2005 | Moll et al. | 370/218 |
| 2008/0071733 A1* | 3/2008 | Shadmon et al. | 707/2 |

OTHER PUBLICATIONS

PCT Written Opinion, PCT/US2005/008613 (filed Mar. 14, 2005), Jun. 15, 2005.

* cited by examiner

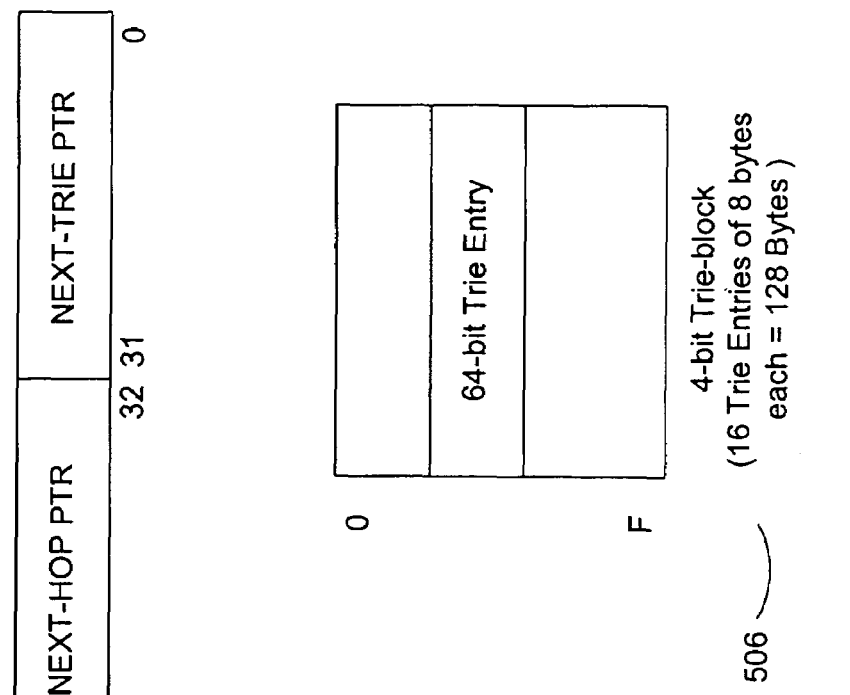
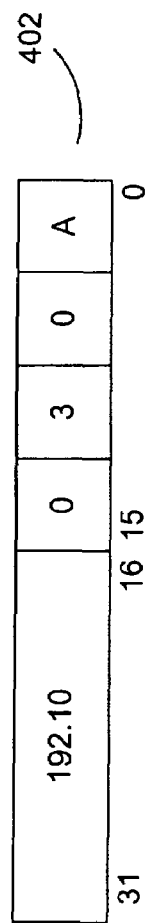
Fig. 5

METHOD AND APPARATUS TO SUPPORT A LARGE INTERNET PROTOCOL FORWARDING INFORMATION BASE

BACKGROUND

1. Field of Invention

The field of invention relates generally to network devices and, more specifically but not exclusively, relates to supporting a large Internet Protocol forwarding information base.

2. Background Information

Networks provide the infrastructure for many forms of communication. LANs (Local Area Network), WANs (Wide Area Network), MANs (Metropolitan Area Network), and the Internet are common networks. Packets sent on networks are often handled by various network devices such as bridges, hubs, switches, and routers.

Routers are special-purpose devices used to interconnect networks. A router can interconnect networks that use different technologies and different addressing schemes. Routers typically support multiple communication protocols.

Interconnecting networks may be done by many different communication protocols. The Internet Protocol (IP) is a Layer 3 protocol that contains addressing information for the routing of packets. Each host is assigned an IP address (a.k.a., an Internet address.) Internet Protocol version 4 (IPv4) uses 32-bit addressing, while Internet Protocol version 6 (IPv6) uses 128-bit addressing. When packets are sent across the Internet, the destination address is attached to the packet. HH A prefix is a portion of a destination address that may be used for IP routing. The prefix may sometimes be expressed in a slash notation. For example, an IPv4 address is usually represented in a dotted decimal notation, for example, 129.52.6.0, where each 8-bit section (an octet) is separated by a decimal. The IPv4 address 129.52.6.0 may have the prefix 129.52/16 meaning the first 16-bits of the IPv4 address are to be used for routing of a packet. The remaining portion of the IPv4 address refers to the destination within a particular network. Usually, this remaining portion refers to a subnet.

Packets traverse the Internet by following a path from their source through routers to their destination. Each router along the path will examine the destination address of the packet. The router will then determine the most efficient way to forward the packet onto its destination. When a router is to forward a packet, it must determine whether it can send the packet directly to its final destination or whether the packet needs to pass through another router. The place the router will forward the packet is often referred to as the next-hop.

Usually, a router maintains tables used to compute the forwarding path of a packet. Routing tables are used to computer optimal routes to the destination and forwarding tables are used to dictate immediate next-hops for the destination. Forwarding tables are updated by routing protocols based on the routing tables. A forwarding table may also be referred to as a Forwarding Information Base (FIB.) When routing or topology changes occur in a network, the IP routing table is updated, and those changes are reflected in the FIB. The FIB maintains next-hop address information based on the information in the IP routing table.

The router uses a next-hop selection process to determine which route from the FIB to use to forward the packet. One method of selection is the Longest Prefix Match (LPM.) In LPM, the router compares the destination address with the route addresses maintained in the FIB. The path with the longest matching prefix is the chosen path.

The FIBs of today's core routers for IPv4 usually maintain 30,000-50,000 prefixes. These large route tables are maintained at Network Access Points such as Metropolitan Area Exchange (MAE) East and MAE West. While large route tables are in the order of 30,000 to 50,000 prefixes, the requirements for the next generation of routers may range from 256,000 to 1 million prefixes. This number of prefixes and their corresponding next-hop entries result in a very large FIB. Current FIB schemes do not provide for efficient storage and manipulation of such a large number of prefixes.

BRIEF DESCRIPTION OF THE DRAWINGS

The present invention is illustrated by way of example and not limitation in the accompanying figures.

FIG. 5 is a block diagram illustrating one embodiment of an IP forwarding scheme in accordance with the teachings of the present invention.

DETAILED DESCRIPTION

Embodiments of a method and system to support a large Internet Protocol forwarding information base are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
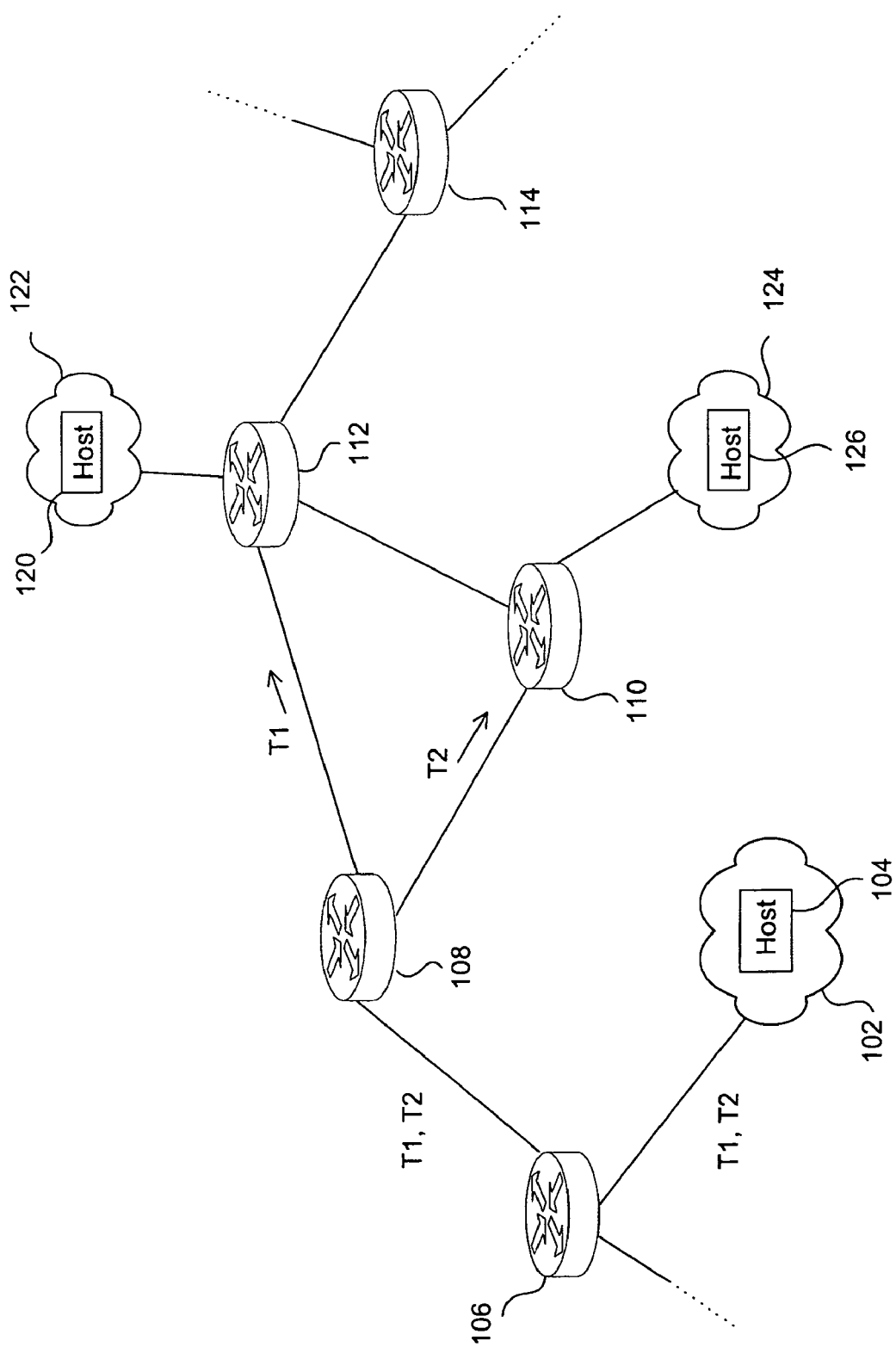
FIG. 1 is a block diagram illustrating one embodiment of a network for IP routing in accordance with the teachings of the present invention.

FIG. 1 shows an embodiment of a network in accordance with the teachings of the present invention. FIG. 1 shows a network 102 communicatively coupled to a router 106. Network 102 includes a host 104. Router 106 is communicatively coupled to a router 108. Router 108 is communicatively coupled to router 110 and router 112. Router 112 is communicatively coupled to router 110 and router 114. Router 112 is communicatively coupled to a network 122 that includes host 120. Router 110 is communicatively coupled to network 124 that includes host 126. Networks 102, 122, and 124 include, but are not limited to, LANs, WANs, MANs, or the like, or any combination thereof. It will be appreciated that the embodiment shown in FIG. 1 may be scaled to include any number of routers coupled in various different communication paths. Also, while embodiments of the present invention are described herein by way of a router, it will be understood that embodiments of the invention are not limited to a router and include other network devices such as, but not limited to, bridges, hubs, and switches. Further, it will be understood that embodiments of the present invention are not limited to the IP but also include lookup on prefixes for any other fields, such as port numbers.

One embodiment of IP forwarding using a FIB will be described in conjunction with FIG. 1. Host 104 sends a transmission T1 to be received by host 120 and a transmission T2 to be received by host 126. Router 106 receives the transmissions T1, T2 and examines their destination IP addresses. Router 106 determines that the next-hop for both transmissions is router 108 and forwards the transmissions to router 108. Router 106 includes a routing table and an FIB. The router 106 uses its routing table to compute the optimal route for the transmissions T1, T2 and uses its FIB to determine the immediate next-hop along the optimal path for each transmission.

Router 108 receives the transmissions. Router 108 analyzes the destination IP addresses of the transmissions. Router 108 determines that the next-hop for transmission T1 is through router 112 and forwards the transmission. Router 108 also determines that the next-hop for the transmission T2 is via router 110 and forwards the transmission. Router 112 forwards transmission T1 to network 122, while router 110 forwards transmission T2 to network 124.

In one embodiment of the present invention, an IP forwarding algorithm implements a LPM using a trie table data structure. Trie (derived from "retrieval") denotes a tree structure for storing information. The trie table entries point into an entry into the next-hop table. Embodiments described herein pertain to a 16-4-4-4 trie table structure, but it will be understood that embodiments of the invention are not limited to such a trie structure. Embodiments of the present invention will be discussed in relation to IPv4), but it will be understood that the embodiments described herein may operate with IPv6, or the like.

Figure 2:
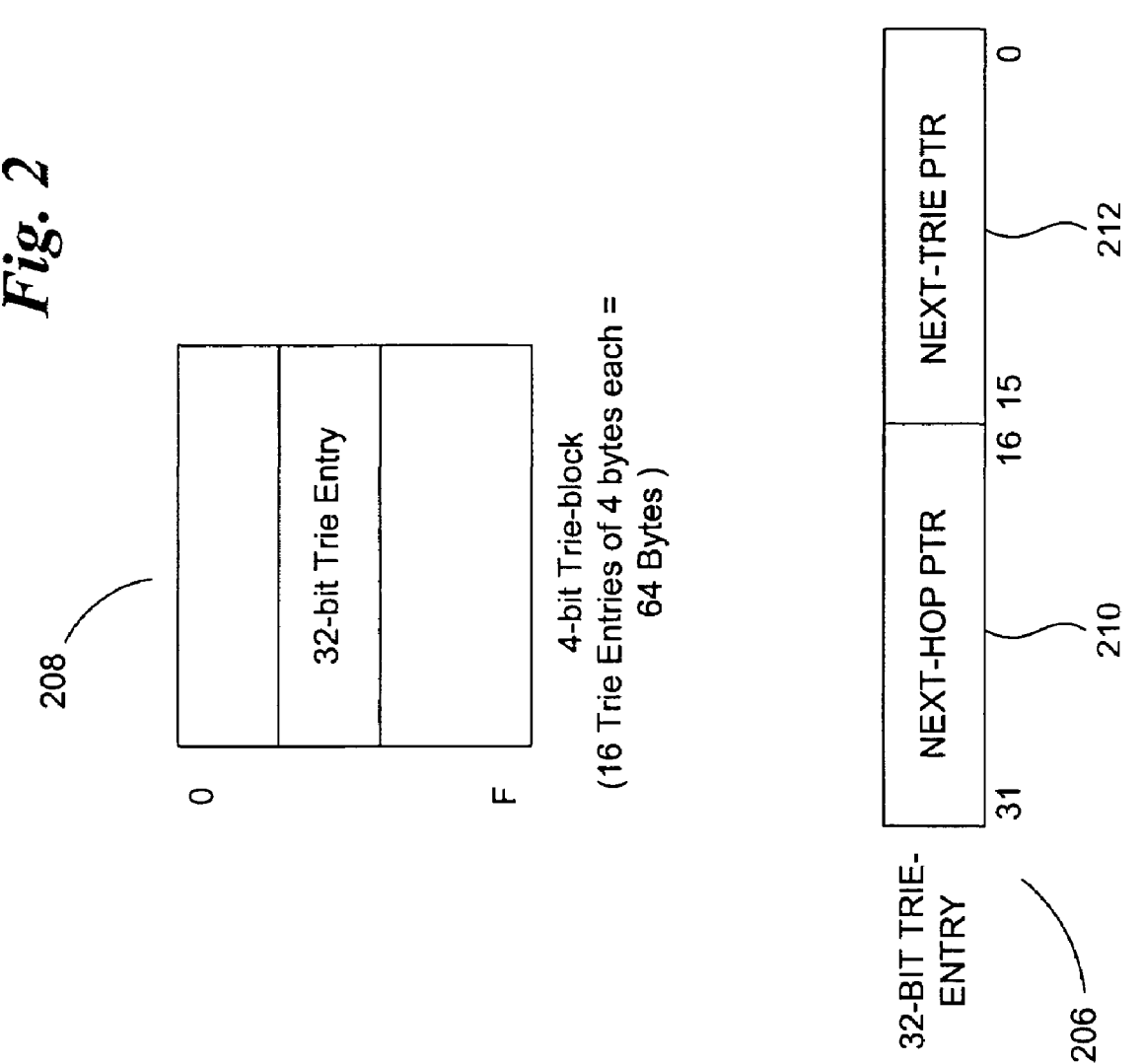
FIG. 2 is a block diagram illustrating one embodiment of an IP forwarding scheme in accordance with the teachings of the present invention.
Figure 3:
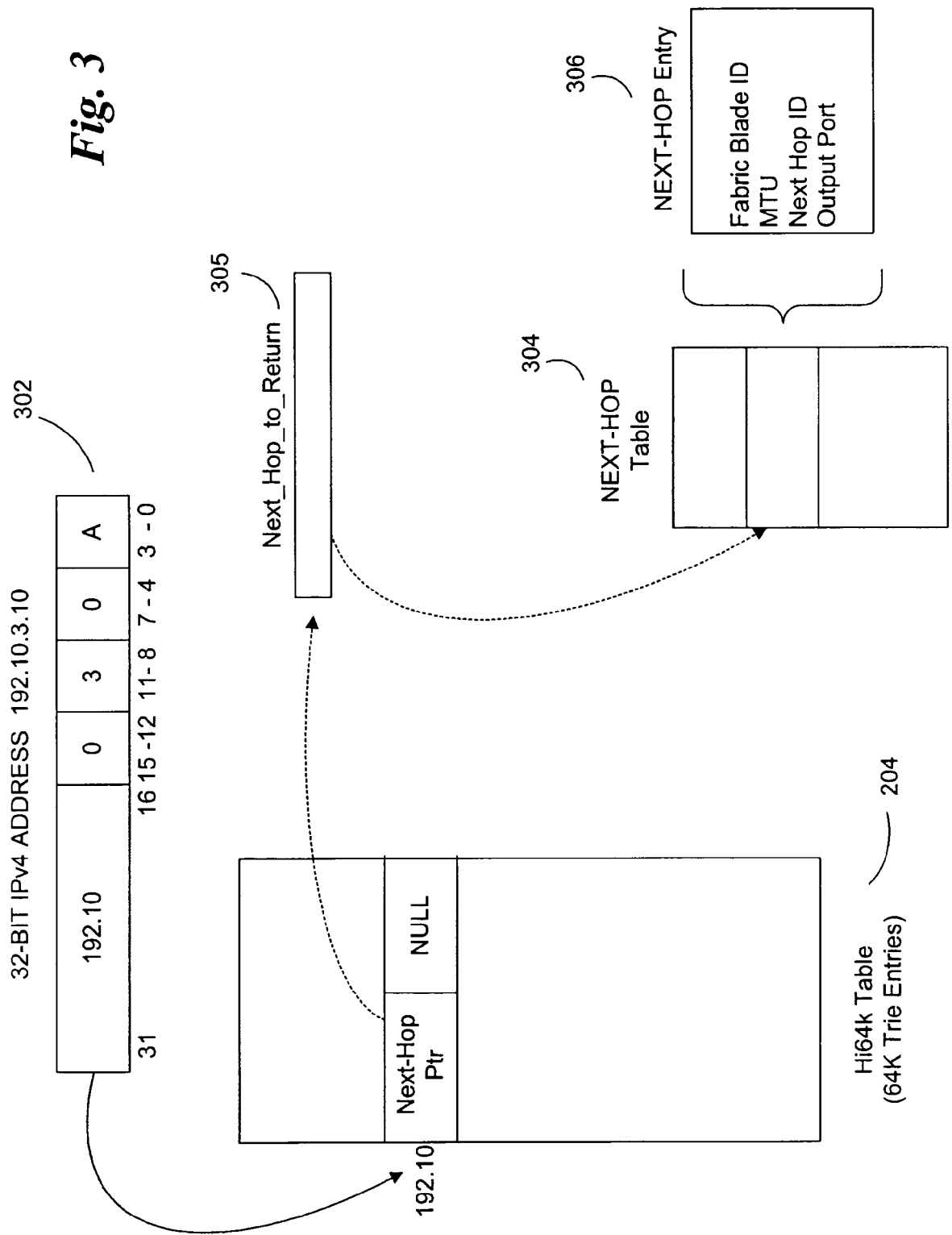
FIG. 3 is a block diagram illustrating one embodiment of an IP forwarding scheme in accordance with the teachings of the present invention.
Figure 4:
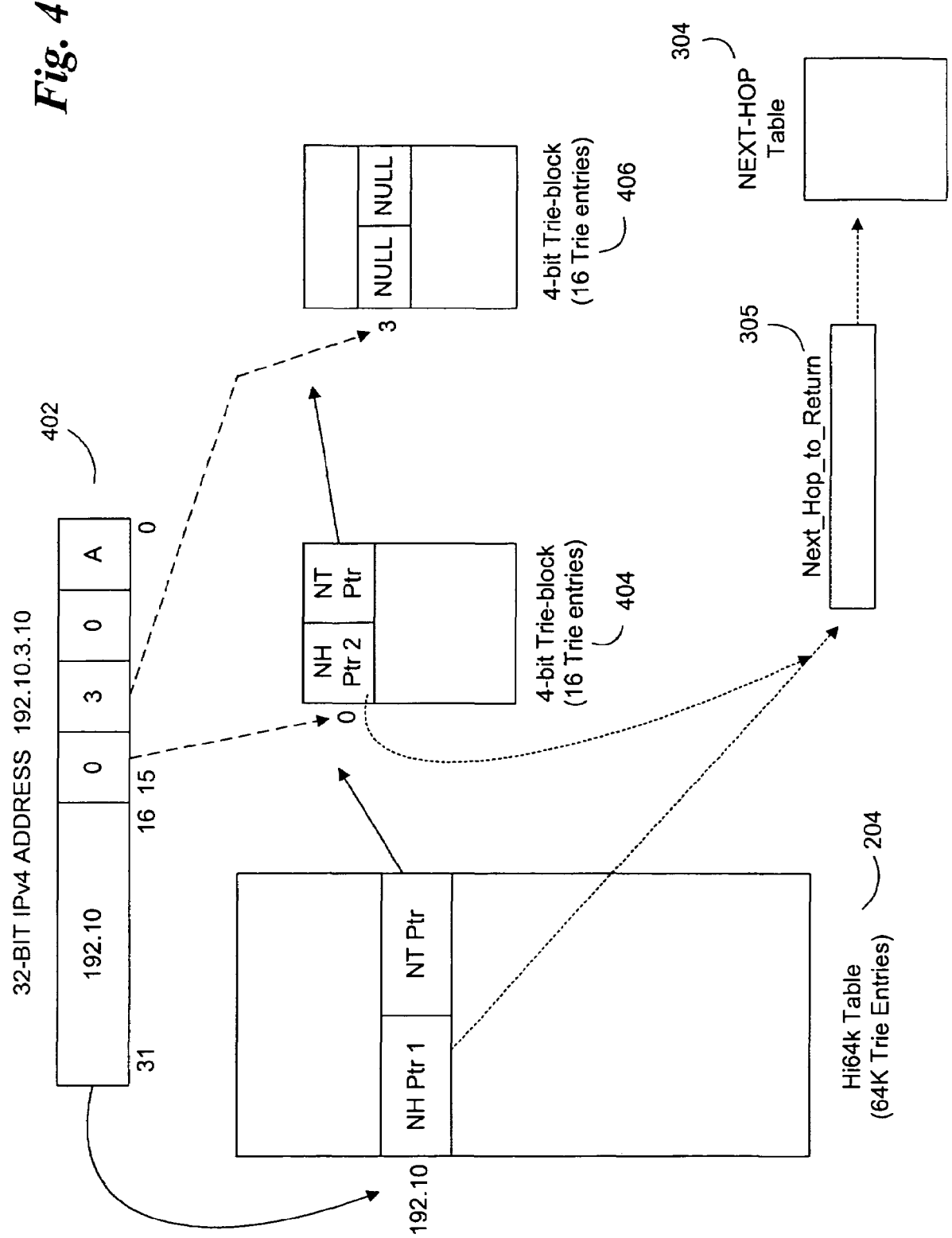
FIG. 4 is a block diagram illustrating one embodiment of an IP forwarding scheme in accordance with the teachings of the present invention.

Referring to FIGS. 2, 3 and 4, one embodiment of an IP forwarding scheme will be described using IPv4. FIG. 2 shows data structures of the scheme; FIGS. 3 and 4 show example implementations of the IP forwarding scheme. A Hi64k Table 204 includes approximately 64k trie entries (2^16) numbered from 0000 to FFFF (hex). Table 204 is indexed by the upper 16 bits of a 32-bit destination IPv4 address.

A 4-bit trie block 208 includes 16 tries entries (2^4) numbered from 0 to F (hex.) Each trie block is indexed into using 4 bits. A trie block is 64 bytes long (16 trie entries of 4 bytes each.) In one embodiment, the trie blocks are stored separately from the Hi64k Table.

A 32-bit trie entry is shown at 206. In one embodiment, each 32-bit trie entry includes a next-hop pointer 210 in bits 16-31 and a next-trie pointer 212 in bits 0 to 15. The next-hop pointer 210 is an index into the next-hop table and the next-trie pointer 212 points to another trie block. In one embodiment, the Hi64k Table and the 4-bit trie blocks are stored in Static Random Access Memory (SRAM) of the router.

In one embodiment, a trie lookup algorithm uses the following procedures. The algorithm implements a Longest Prefix Match (LPM) lookup into the Hi64k Table 204. The algorithm will analyze the corresponding trie entry. If the next-hop pointer is not NULL, then the next-hop pointer is used to update a next_hop_to_return variable.

While the next-trie pointer of the trie entry in the Table 204 is not NULL, the next-trie pointer is followed to a trie block. This trie block is indexed into using the next 4-bit portion of the destination IP address to find a trie entry within the trie block. If the next-hop pointer of this trie entry is not NULL, then this next-hop pointer is used to update the next_hop_to_return.

While the next-trie pointer of this trie entry is not NULL, the next-trie pointer is followed to another trie block. The process is repeated as long as the next-trie pointer is not NULL. When the next-trie pointer is NULL, the next-hop pointer in the next_hop_to_return is returned and used to enter the next-hop table. The following pseudo-code describes an embodiment of the trie lookup algorithm:

```
Trie_lookup( )
{
    next_hop_to_return = default_value;
    index = Get_first_16_bits_as_index;
    lookup = Lookup_hi64ktrie(index);
    next_trie_ptr = extract_next_trie(lookup);
    next_hop_ptr = extract_next_hop(lookup);
    if (next_hop_ptr != NULL)
        next_hop_to_return = next_hop_ptr;
    while (next_trie_ptr != NULL)
    {
        index = Get_next_4_bits_as_index;
        lookup = Lookup_trie(index);
        next_trie_ptr = extract_next_trie(lookup);
        next_hop_ptr = extract_next_hop(lookup);
        if (next_hop_ptr != NULL)
            next_hop_to_return = next_hop_ptr;
    }
}
```

In FIG. 3, a 32-bit destination IPv4 address 192.10.3.10 is shown at 302. The lower 16-bits of the address are represented as 3.10 in decimal notation. When these 16-bits are separated into 4-bit sections, the address is represented as 030A (hex), as shown at 302. IPv4 address 192.10.3.10 is used repeatedly herein as an example, but it will be understood that embodiments of the invention are not limited to these examples.

In FIG. 3, the lookup algorithm indexes into the Hi64k Table 204 using the upper 16 bits (also referred to as the high 16-bits) of the destination IPv4 address. The next-hop pointer of the trie entry is not NULL, so the next_hop_to_return 305 is updated with the next-hop pointer from Table 204. The next-trie pointer of the entry is NULL, so the lookup ends. The next_hop_to_return 305 is returned and then followed into the next-hop table 304.

The next-hop table 304 contains information used by the router to forward the packet. An embodiment of a next-hop entry, shown at 306, includes a fabric blade identification, maximum transmission unit (MTU) information, a next-hop In FIG. 4, 32-bit destination IPv4 address 192.10.3.10 is shown at 402. The lookup algorithm indexes into the Hi64k Table 204 using the upper 16-bits of the destination IPv4 address. The next-hop pointer is Next-Hop Pointer 1 (NH Ptr 1), so the algorithm updates the next_hop_to_return 305 to NH Ptr 1. The next-trie pointer in this trie entry is not NULL, so the next-trie pointer is followed to trie block 404. Trie block 404 is indexed based on the next 4-bits of the destination IPv4 address. Bits 12-15 of the destination IPv4 address are 0, so trie block 404 is indexed into its 0 entry. The next-hop pointer is NH Ptr 2, so the algorithm updates the next_hop_to_return 305 to NH Ptr 2. The next-trie pointer of this trie entry is not NULL, so the lookup algorithm follows the next-trie pointer to trie block 406. Trie block 406 is indexed into at entry 3 based on the destination IPv4 address bits 8-11. Since the next-hop pointer of this trie entry is NULL, the algorithm does not update the next_hop_to_return. Since the next-trie pointer is NULL, the lookup is complete. Next_hop_to_return 305 is returned, which is NH Ptr 2. NH Ptr 2 is followed to a next-hop entry in the next-hop table 304.

It will be appreciated that in another example where the next-trie pointer in entry 3 of block 406 was not NULL, the algorithm may continue into another trie block indexed by bits 4-7 of the destination IPv4 address. The lookup algorithm continues as long as the next-trie pointer is not NULL, or all bits of the destination IPv4 address have been used in the lookup.

A disadvantage of the trie block scheme described above is that the number of trie blocks available is limited by the size of the 16-bit next-trie pointer in the Hi64k Table. The 16-bit next-trie pointer can only point to approximately 64,000 trie blocks (2^16=65,536.) Assuming that 64k next-hops are needed, such as in MultiProtocol Label Switching (MLPS), only 64k trie blocks are available for use by the forwarding algorithm.

After analysis of trie block usage with the MAE West Route Table, the following observation was made. Supporting n prefixes requires n/2 trie blocks on an average. This implies that 64k trie blocks will only be sufficient to support approximately 128k route prefixes. Embodiments of the present invention increase the number of trie blocks available to the FIB. Thus, the FIB may store more than 128k route prefixes and their corresponding next hops FIG. 5 shows an embodiment to support a large IP FIB. In this embodiment, the forwarding scheme uses a 64-bit trie entry, as shown at 504. In the 64-bit trie entry 504, the next-hop pointer is 32-bits long and the next-trie pointer is 32 bits long. This enables a single trie entry to point to approximately 4.3 billion trie blocks (2^32) instead of approximately 64,000 tire blocks (2^16). A trie block with a 64-bit trie entry is shown at 506. The forwarding algorithm may navigate the trie blocks to find the next-hop pointer similarly as described above in conjunction with FIGS. 2-4.

Figure 6:
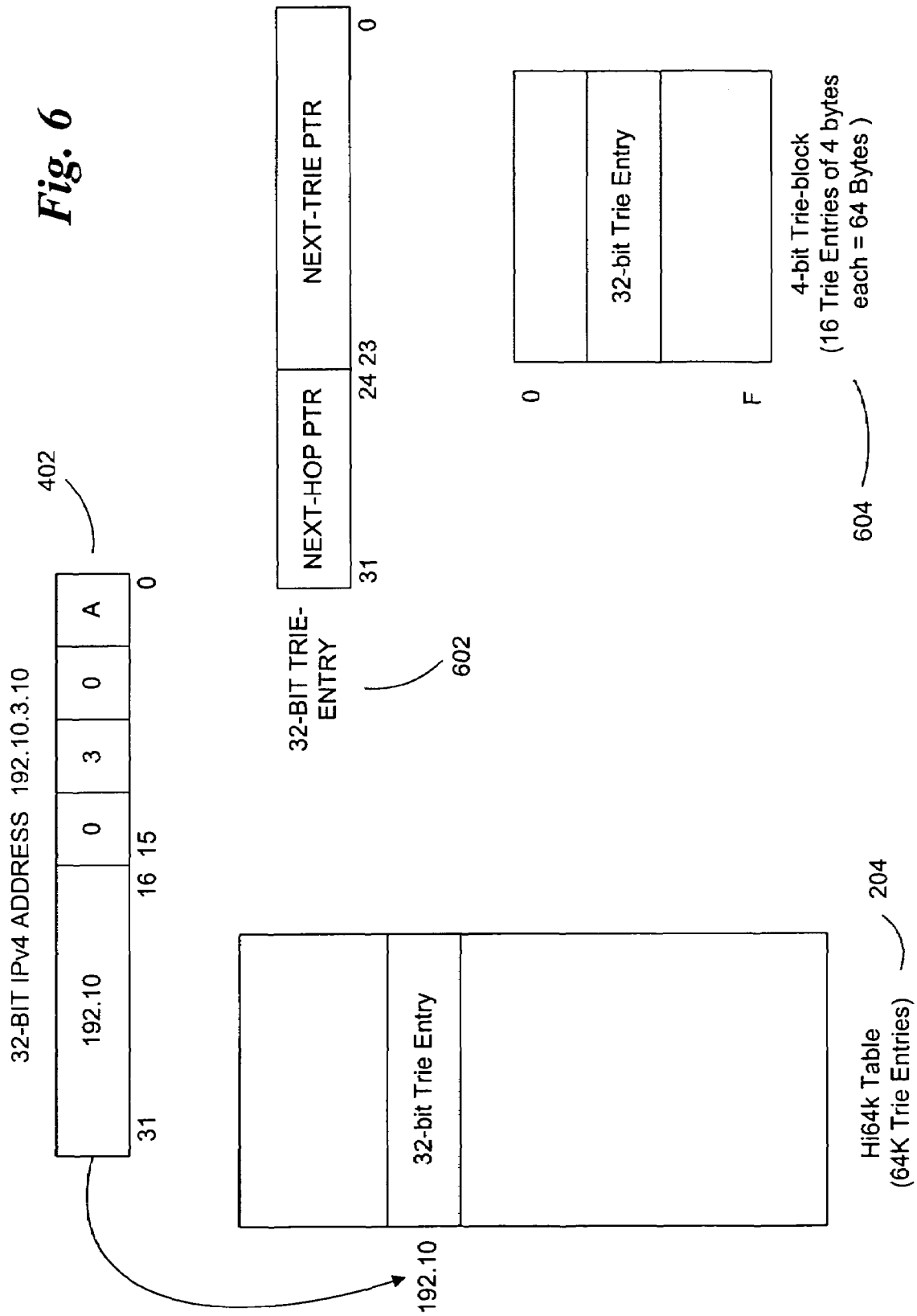
FIG. 6 is a block diagram illustrating one embodiment of an IP forwarding scheme in accordance with the teachings of the present invention.

FIG. 6 shows another embodiment of the invention to support a large IP FIB. In this embodiment, a 32-bit trie entry, shown at 602, includes an 8-bit next-hop pointer and a 24-bit next-trie pointer. This allows the trie entry 602 to point to approximately 16.8 million next-trie blocks (2^24). However, because the next-hop pointer is 8-bits, the number of next-hops in the next-hop table is limited to 256 (2^8). A trie block shown at 604 includes 16 trie entries where each entry has the format as shown at 602. The forwarding algorithm may navigate the trie blocks to find the next-hop pointer similarly as described above in conjunction with FIGS. 2-4.

Figure 7:
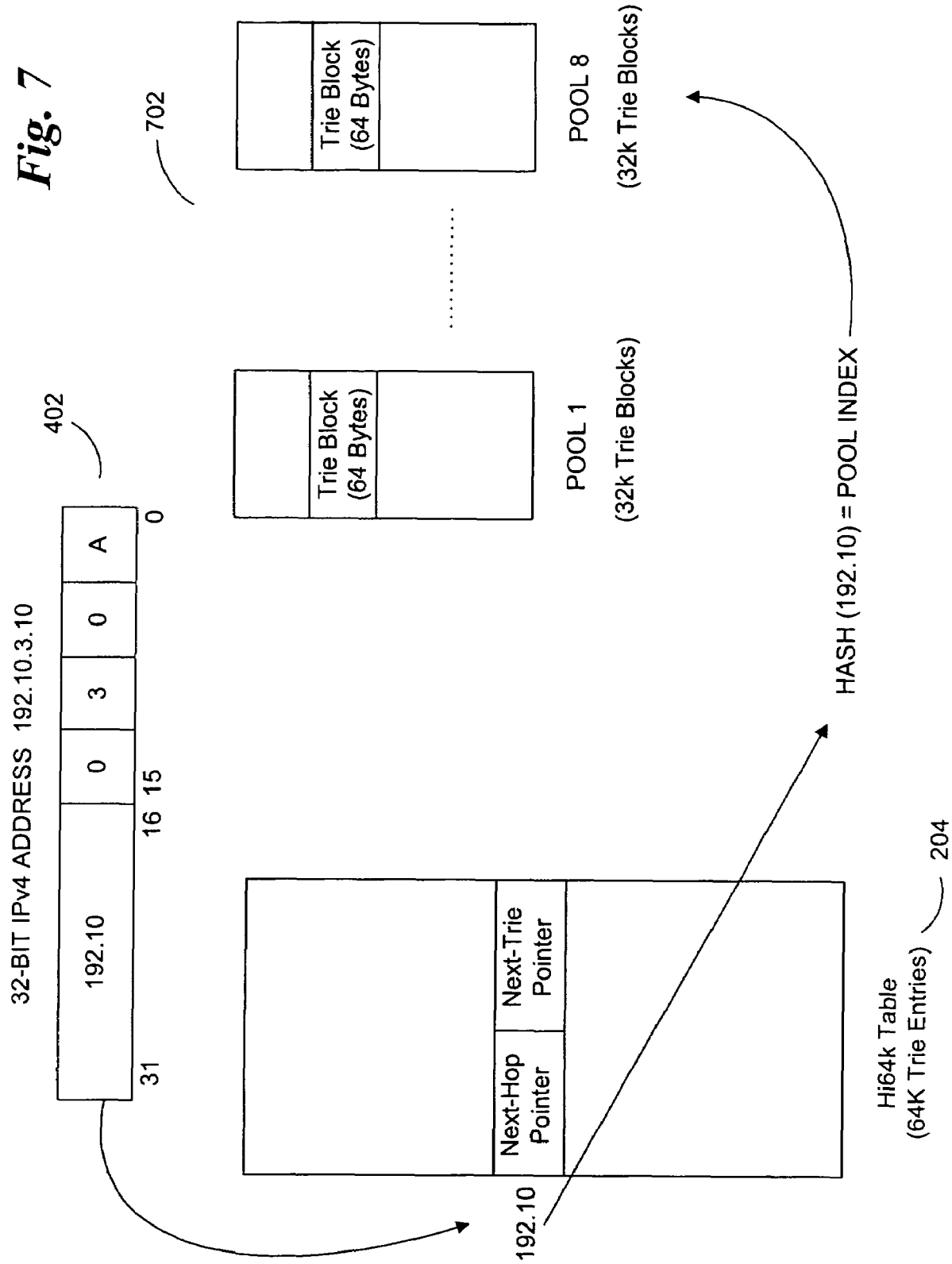
FIG. 7 is a block diagram illustrating one embodiment of an IP forwarding scheme in accordance with the teachings of the present invention.
Figure 8:
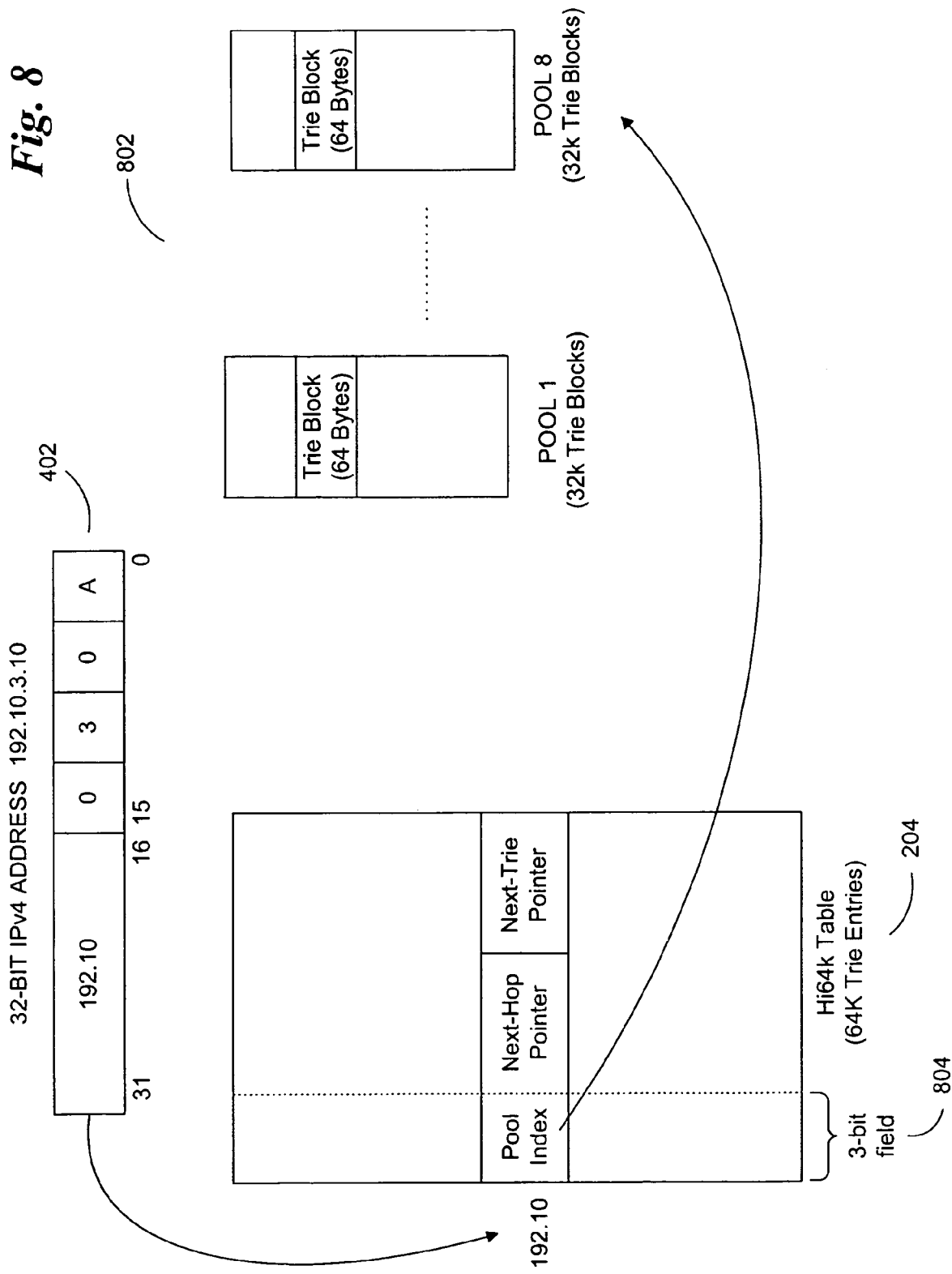
FIG. 8 is a block diagram illustrating one embodiment of an IP forwarding scheme in accordance with the teachings of the present invention.

FIGS. 7 and 8 show embodiments of the present invention to support a large IP FIB using pools of trie blocks. The forwarding algorithm derives a pool index to determine which pool of trie blocks to navigate to find the appropriate next-hop pointer. In the embodiment of FIG. 7, a hash is used to determine the pool index. In the embodiment of FIG. 8, an extra field in the Hi64k Table 204 is used to determine the pool index. The forwarding algorithm determines the pool index for an entry in the Hi64k Table in order to know the correct pool to navigate through in order to find the next-hop pointer. The pool index corresponds to a pool base address for that pool.

Generally, n pools of trie blocks are maintained. As described above, each trie block is 64 bytes long (16 trie entries of 32-bits each.) Each pool may have up to approximately 64k trie blocks. In one embodiment, every entry in the Hi64k Table 204 references trie blocks from only one pool. Thus, that pool includes trie blocks from a single branch of the Hi64k Table 204.

In one embodiment, the base addresses for the pools may be maintained in local memory of the router. In another embodiment, the pools are maintained as linked lists. The use of pools of trie blocks allows for an increase in the number of trie blocks available without degrading performance of the router.

Referring to FIG. 7, an embodiment using pools of trie blocks is shown. In the embodiment of FIG. 7, there are 8 pools with each pool having approximately 32k trie blocks as shown at 702.

The pool for a particular entry in the Hi64k Table is determined by hashing the upper 16 bits of the destination IP address into a value from 1 to n where n is the total number of pools. In FIG. 7, a 32-bit destination IPv4 address of 192.10.3.10 is shown at 402. The upper 16 bits 192.10 are put through a hash function to determine the pool number. In FIG. 7, the hash of 192.10 results in a pool index for pool 8. The forwarding algorithm will then work through the trie blocks of pool 8 to determine the next-hop for the destination IP address 192.10.3.10. The forwarding algorithm will start with the trie entry indexed by 192.10 in the Hi64k Table and proceed as described above in conjunction with FIGS. 2-4.

The hashing scheme is easy to implement with minimal changes to the fast path of the router. There is no need for additional memory for the trie block addresses because the next-trie pointer of a trie entry can remain at 16-bits. Also, no additional memory or modification of existing lookup data structures are needed to support more trie blocks. The memory utilization is unaffected by this scheme since each trie entry is still 32-bits. In the embodiment of FIG. 7, the allocation of Hi64k Table 204 entries to pools and the size of each pool is fixed at compile time of the code. A sufficiently random hash algorithm will result in substantially equal distribution of Hi64k Table entries across the pools.

Referring to FIG. 8, an embodiment of the present invention using pools of trie blocks is shown. FIG. 8 shows IPv4 destination address 192.10.3.10 at 402 and the Hi64k Table 204. Shown at 802 are 8 pools with each pool having approximately 32k trie blocks. The pool index is maintained as a separate field in addition to the next-hop pointer and the next-tire pointer fields of the Hi64k Table 204. In FIG. 8, a 3-bit field 804 is added to the 32-bit trie entries in Table 204 to indicate the pool index for each trie entry in Table 204. In the embodiment of FIG. 8, the pool index of 192.10 is pool 8. It will be understood that in the embodiment of FIG. 8, the storage requirements of Table 204 may increase slightly because of the addition of the pool index field.

In the embodiment of FIG. 8, the router may balance the use of pools during runtime of the router. The router can analyze the pools and add trie entries to under-utilized pools. In one embodiment, this balancing of pools may be performed at least in part by an XScale™ Processor of the Intel Internet eXchange Processor (IXP) family. When a destination IPv4 address prefix gets added to the Hi64k Table 204 for indexing, the router determines which pool to use for the destination IP address prefix to balance utilization of the pools. The pool index for that entry is set accordingly.

In an alternative embodiment of balancing the pools, an existing pool may be split into smaller pools at runtime. For example, if a pool has 1024 4-bit trie blocks and is under-utilized, then it can be broken into 2 different 512 4-bit trie block pools. When a destination IPv4 address prefix gets added to the Hi64k Table 204 for indexing, trie blocks can be used from the new pool broken off from the under-utilized pool. Since the pool index is dynamically assigned, setup code can make such optimizations.

In another embodiment, a pool index may be assigned to prevent a pool overflow. If a particular pool will run out of trie blocks after adding a new trie entry to the Hi64k Table, then a larger pool can be assigned to that particular Hi64k Table entry to prevent the overflow.

Figure 9:
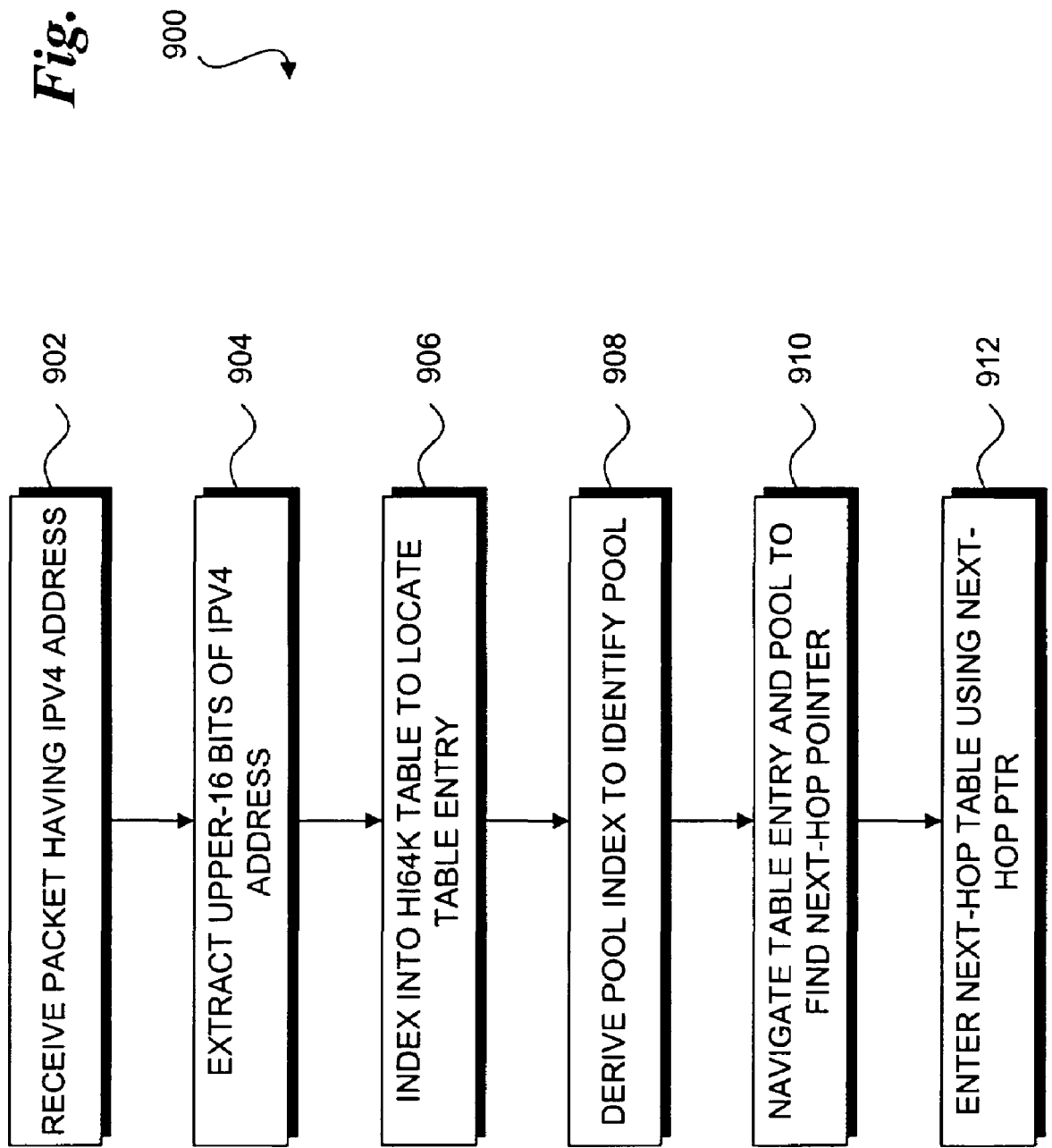
FIG. 9 is a flowchart illustrating one embodiment of the logic and operations to support a large IP forwarding information base on a network device in accordance with the teachings of the present invention.

FIG. 9 shows a flowchart 900 illustrating one embodiment of the logic and operations to support a large IP forwarding information base. Starting at a block 902, a router receives a packet having a destination IPv4 address. Proceeding to a block 904, the upper 16-bits of the destination IPv4 address are extracted. A Hi64k Table is indexed into using the upper 16-bits to locate an entry in the table associated with the upper 16-bits, as depicted in a block 906. Continuing in a block 908, a pool index identifying a particular pool is derived. In one embodiment, the pool index is derived by reading a pool index from a field in the entry located the Hi64k Table. In another embodiment, a hash is performed on the upper 16-bits of the destination IP address to derive the pool index. The logic then proceeds to a block 910 to navigate through the Hi64k Table entry and the pool to find the next-hop pointer. In one embodiment, the trie lookup algorithm as described above is used to navigate the Hi64k Table entry and the pool. Continuing to a block 912, the next-hop table is entered using the next-hop pointer. The router uses the next-hop information from the next-hop table to forward the packet.

It will be understood that embodiments of the present invention do not require additional memory bandwidth for the look up of forwarding information. The embodiment of FIG. 8 may need minimal additional bandwidth due to the additional pool index field in the Hi64k Table. Thus, embodiments of the present invention allow for a router to maintain a large FIB with little impact to memory utilization.

Figure 10:
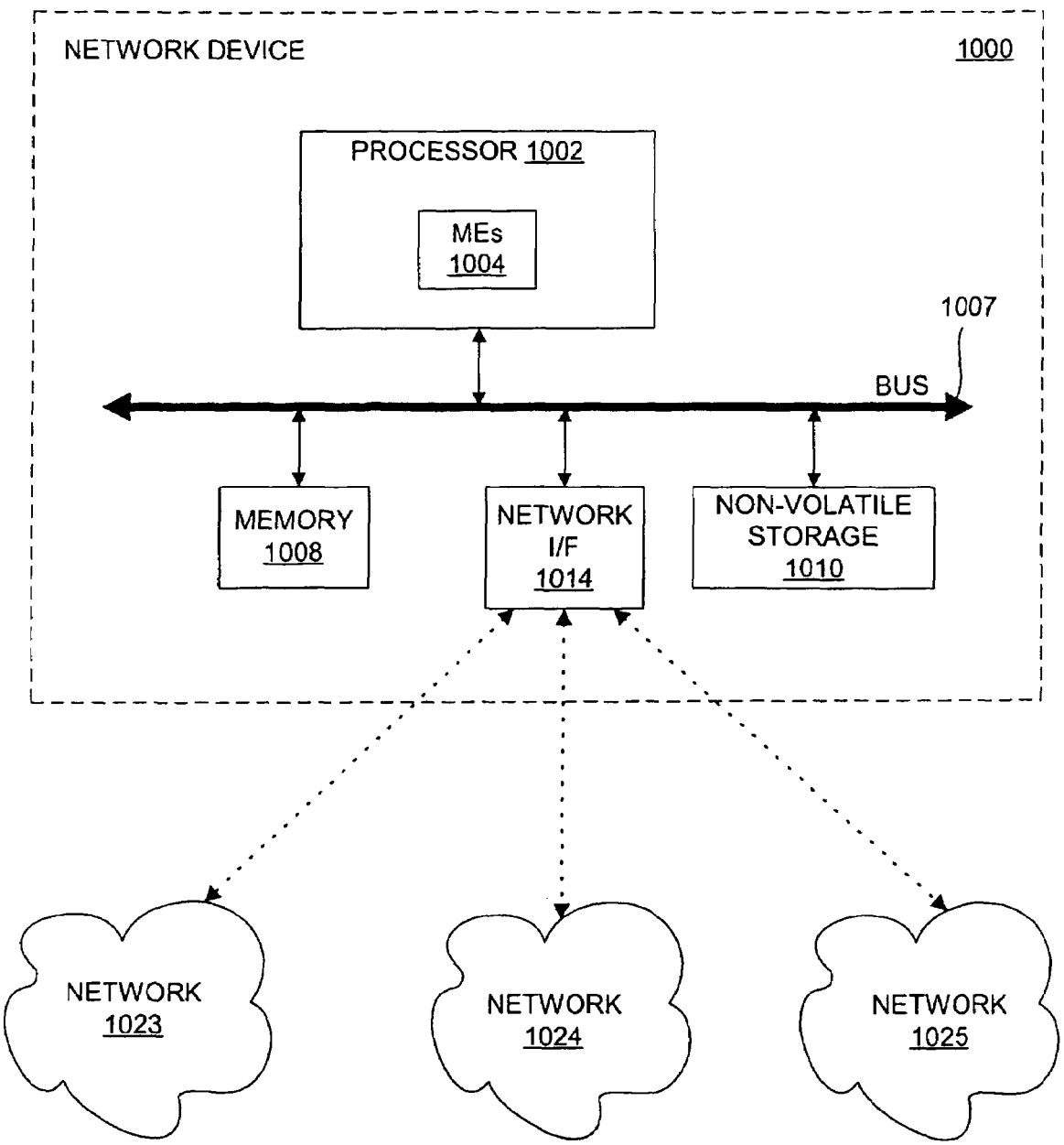
FIG. 10 is a block diagram illustrating one embodiment of a network device in accordance with the teachings of the present invention.

FIG. 10 is an illustration of one embodiment of an example network device 1000 on which embodiments of the present invention may be implemented. In one embodiment, network device 1000 is a router. Network device 1000 includes a processor 1002 coupled to a bus 1007. Memory 1008, non-volatile storage 1010, and network interface 1014 are also coupled to bus 1007. The network device 1000 interfaces to networks through the network interface 1014.

As shown in FIG. 10, network device 1000 interconnects a network 1023, a network 1024, and a network 1025. The network device 1000 includes ports (not shown) for connecting the networks to the network interface 1014. Such networks include a local area network (LAN), wide area network (WAN), or the Internet. Networks 1023, 1024, and 1025 may include at least one host device (not shown) such as a personal computer, a server, a mainframe computer, or the like. The network device 1000 can interconnect networks that use different technologies, including different media, physical addressing schemes, and frame formats. While FIG. 10 shows the network device 1000 interconnecting three networks 1023, 1024 and 1025, it will be understood that network device 1000 may be connected to more or less than three networks. Network device 1000 may operate with IPv4, IPv6, or the like.

Processor 1002 may be a network processor including, but not limited to, an Intel® Corporation IXP (Internet eXchange Processor) family processor such as the IXP 4xx, IXP12xx, IXP24xx, IXP28xx, or the like. In one embodiment, processor 1002 includes a plurality of micro-engines (MEs) 1004 operating in parallel, each micro-engine managing a plurality of threads for packet processing. In one embodiment of a micro-engine, code to execute on the micro-engine is stored in volatile memory within the micro-engine. In another embodiment, the code is downloaded from a network to a micro-engine when the router is turned on.

Memory 1008 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. A typical network device will usually include at least a processor 1002, memory 1008, and a bus 1007 coupling memory 1008 to processor 1002.

The network device 1000 also includes non-volatile storage 1010 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like. It is appreciated that instructions (e.g., software, firmware, etc.) may reside in memory 1008, non-volatile storage 1010 or may be transmitted or received via network interface 1014.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
   receiving a packet at a network device, the packet including a destination address;
   indexing into a table using a portion of the destination address to locate an entry in the table associated with the portion of the destination address;
   deriving a pool index associated with the portion of the destination address to identify a pool of trie blocks from among a plurality of pools of trie blocks located in a same memory unit, wherein each trie block comprises a plurality of trie entries, each trie entry comprising a next-hop pointer and a next-trie pointer to reference trie entries located in the pool of trie blocks including the next-hop pointer and the next-trie pointer;

navigating the entry and the pool of trie blocks that is identified to find a next-hop for the packet;

examining the plurality of pools of trie blocks to find an under-utilized pool;

splitting the under-utilized pool into a first pool of trie blocks and a second pool of trie blocks; and adding a second entry to the table indexed by a portion of a second destination address, a second pool index associated with the portion of the second destination address to correspond to the second pool of trie blocks.

2. The method of claim 1 wherein the entry in the table comprises a next-hop pointer and a next-trie pointer.

3. The method of claim 1 wherein navigating the entry and the pool of the blocks comprises:

updating a next-hop-to-return with the next-hop pointer if the next-hop pointer is not null;

following the next-trie pointer to a trie block within the pool if the next-trie pointer is not null and indexing into the trie block with a second portion of the destination address; and following the next-hop-to-return to a next-hop table if the next-trie pointer is null.

4. The method of claim 1 wherein deriving the pool index comprises performing a hash on the portion of the destination address to obtain the pool index.

5. The method of claim 1 wherein deriving the pool index comprises reading the pool index associated with the portion of the destination address from the entry in the table, wherein the pool index is a separate field in addition to a next-hop pointer and next-trie pointer in the entry in the table.

6. The method of claim 1, further comprising:

examining the plurality of pools of the blocks to find an under-utilized pool; and adding a second entry to the table indexed by a portion of a second destination address, a second pool index associated with the portion of the second destination address to correspond to the under-utilized pool.

7. The method of claim 1, further comprising:

examining the plurality of pools of trie blocks to find a potential overflow pool; and adding a second entry to the table indexed by a portion of a second destination address, a second pool index associated with the portion of the second destination address not to be associated with the potential overflow pool.

8. A method, comprising:

receiving a packet at a router, the packet including a destination internet protocol (IP) address;

indexing into a table comprising a plurality of trie entries using a portion of the destination IP address to find a trie entry of the plurality of trie entries, wherein each trie entry comprises 64-bits;

deriving a pool index associated with the portion of the destination address to identify a pool of trie blocks from among a plurality of pools of trie blocks located in a same memory unit, wherein each trie block comprises a plurality of trie entries, each trie entry comprising a next-hop pointer and a next-trie pointer to reference trie entries located in the pool of trie blocks including the next-hop pointer and the next-trie pointer;

navigating the trie entry and the pool of trie blocks that is identified to follow the trie entry to find a next-hop for the packet;

examining the plurality of pools of trie blocks to find an under-utilized pool;

splitting the under-utilized pool into a first pool of trie blocks and a second pool of trie blocks; and adding a second entry to the table indexed by a portion of a second destination address, a second pool index associated with the portion of the second destination address to correspond to the second pool of trie blocks.

9. The method of claim 8 wherein following the trie entry comprises:

updating a next-hop-to-return with the next-hop pointer if the next-hop pointer is not null;

following the next-trie pointer to a trie block if the next-trie pointer is not null and indexing into the trie block with a second portion of the destination IP address; and following the next-hop-to-return to a next-hop table if the next-trie pointer is null.

10. A method, comprising:

receiving a packet at a router, the packet including a destination internet protocol (IP) address;

indexing into a table comprising a plurality of trie entries using a portion of the destination IP address to find a trie entry of the plurality of trie entries, wherein each trie entry comprises a next-hop pointer and a next-trie pointer, the next-trie pointer comprising more bits than the next-hop pointer;

deriving a pool index associated with the portion of the destination address to identify a pool of trie blocks from among a plurality of pools of trie blocks located in a same memory unit, wherein each trie block comprises a plurality of trie entries, each trie entry comprising a next-hop pointer and a next-trie pointer to reference trie entries located in the pool of trie blocks including the next-hop pointer and the next-trie pointer;

navigating the trie entry and the pool of trie blocks that is identified to find a next-hop for the packet;

examining the plurality of pools of trie blocks to find an under-utilized pool;

splitting the under-utilized pool into a first pool of trie blocks and a second pool of trie blocks; and adding a second entry to the table indexed by a portion of a second destination address, a second pool index associated with the portion of the second destination address to correspond to the second pool of trie blocks.

11. The method of claim 10 wherein the next-hop pointer comprises 8-bits and the next-trie pointer comprises 24-bits.

12. An article of manufacture comprising:

a machine-readable medium including a plurality of computer executable instructions which when executed perform operations comprising:

receiving a packet at a router, the packet including a destination internet protocol (IP) address;

indexing into a table using a portion of the destination IP address to locate an entry in the table associated with the portion of the destination IP address;

deriving a pool index associated with the portion of the destination IP address to identify a pool of trie blocks from among a plurality of pools of trie blocks in a same memory unit, wherein each trie block comprises a plurality of trie entries, each trie entry comprising a next hop pointer and a next-trie pointer to reference trie entries located in the pool of trie blocks including the next-hop pointer and the next-trie pointer;

navigating the entry and the pool of trie blocks that is identified to find a next-hop for the packet;
examining the plurality of pools of trie blocks to find an under-utilized pool;
splitting the under-utilized pool into a first pool of trie blocks and a second pool of trie blocks; and
adding a second entry to the table indexed by a portion of a second destination IP address, a second pool index associated with the portion of the second destination IP address to correspond to second pool of trie blocks.

13. The article of manufacture of claim 12 wherein the entry in the table comprises a next-hop pointer and a next-trie pointer.

14. An article of manufacture of claim 12 wherein navigating the entry and the pool of trie blocks comprises:
   updating a next-hop-to-return with the next-hop pointer if the next-hop pointer is not null;
   following the next-trie pointer to a the block within the pool if the next-trie pointer is not null and indexing into the trie block with a second portion of the destination IP address; and
   following the next-hop-to-return to a next-hop table if the next-trie pointer is null.

15. The article of manufacture of claim 12 wherein deriving the pool index comprises performing a hash on the portion of the destination IP address to obtain the pool index.

16. The article of manufacture of claim 12 wherein deriving the pool index comprises reading the pool index associated with the portion of the destination IP address from the entry in the table.

17. The article of manufacture of claim 12 wherein execution of the plurality of computer executable instructions further perform operations comprising:
   examining the plurality of pools of the blocks to find an under-utilized pool; and
   adding a second entry to the table indexed by a portion of a second destination IP address, a second pool index associated with the portion of the second destination IP address to correspond to the under-utilized pool.

18. The article of manufacture of claim 12 wherein execution of the plurality of computer executable instructions further perform operations comprising:
   examining the plurality of pools of trie blocks to find a potential overflow pool; and
   adding a second entry to the table indexed by a portion of a second destination address, a second pool index associated with the portion of the second destination IP address to not be assigned to the potential overflow pool.

19. A network device, comprising:
a plurality of ports;
a processor communicatively coupled to each of the plurality of ports; and
a storage device operatively coupled to the processor, the storage device including a plurality of instructions which when executed by the processor perform operations comprising:
   receiving a packet at a first port of the plurality of ports, the packet including a destination address;
   indexing into a table using a portion of the destination address to locate an entry in the table associated with the portion of the destination address;
   deriving a pool index associated with the portion of the destination address to identify a pool of the blocks from a plurality of pools of trie blocks in a same memory unit, wherein each trie block comprises a plurality of trie entries, each the entry comprising a next-hop pointer and a next-trie pointer to reference trie entries located in the pool of trie blocks including the next-hop pointer and the next-trie pointer;
   navigating the entry and the pool of trie blocks to find a next-hop for the packet;
   examining the plurality of pools of trie blocks to find an under-utilized pool;
   splitting the under-utilized pool into a first pool of trie blocks and a second pool of trie blocks;
   adding a second entry to the table indexed by a portion of a second destination address, a second pool index associated with the portion of the second destination address to correspond to the second pool of trie blocks; and
   outputting the packet from a second port of the plurality of ports to the next-hop.

20. The network device of claim 19 wherein the plurality of pools of trie blocks is stored as a link list in a memory device operatively coupled to the processor.

21. The network device of claim 19 wherein deriving the pool index comprises performing a hash on the portion of the destination address to obtain the pool index.

22. The network device of claim 19 wherein deriving the pool index comprises reading the pool index associated with the portion of the destination address from the entry in the table.

23. The method of claim 10 wherein following the trie entry comprises:
   updating a next-hop-to-return with the next-hop pointer if the next-hop pointer is not null;
   following the next-trie pointer to a trie block if the next-trie pointer is not null and indexing into the data block with a second portion of the destination IP address; and
   following the next-hop-to-return to a next-hop table if the next-trie pointer is null.

* * * * *